US012418148B2

(12) United States Patent
Zhang et al.

(10) Patent No.: US 12,418,148 B2
(45) Date of Patent: Sep. 16, 2025

(54) CONNECTOR, CABLE CONNECTION ASSEMBLY AND CONNECTOR ASSEMBLY

(71) Applicants: Tyco Electronics (Shanghai) Co. Ltd., Shanghai (CN); SIBAS Electronics (Xiamen) Co. Ltd., Xiamen (CN)

(72) Inventors: Daokuan (Jeremy) Zhang, Shanghai (CN); Weidong (Randy) Huang, Xiamen (CN); Yong (Chris) Wang, Shanghai (CN); Yu (Rain) Wang, Shanghai (CN); Hua He, Shanghai (CN); Yingchun (David) Wang, Shanghai (CN); Liqiang (Gino) Yao, Shanghai (CN)

(73) Assignees: Tyco Electronics (Shanghai) Co., Ltd., Shanghai (CN); SIBAS Electronics (Xiamen) Co., Ltd., Xiamen (CN)

( * ) Notice: Subject to any disclaimer, the term of this patent is extended or adjusted under 35 U.S.C. 154(b) by 626 days.

(21) Appl. No.: 17/884,992

(22) Filed: Aug. 10, 2022

(65) Prior Publication Data

US 2023/0048221 A1 Feb. 16, 2023

(30) Foreign Application Priority Data

Aug. 10, 2021 (CN) ........................ 202110913098.X

(51) Int. Cl.

| | |
|---|---|
| ***H01R 13/66*** | (2006.01) |
| ***H01R 4/02*** | (2006.01) |
| ***H01R 4/18*** | (2006.01) |
| ***H01R 12/75*** | (2011.01) |
| ***H01R 13/502*** | (2006.01) |
| ***H01R 13/52*** | (2006.01) |
| ***H01R 13/622*** | (2006.01) |
| ***H01R 13/6581*** | (2011.01) |
| ***H01R 13/6591*** | (2011.01) |

(52) U.S. Cl.

CPC ......... *H01R 13/6616* (2013.01); *H01R 12/75* (2013.01); *H01R 13/502* (2013.01); *H01R 13/65912* (2020.08); *H01R 4/029* (2013.01); *H01R 4/183* (2013.01); *H01R 13/5202* (2013.01); *H01R 13/5205* (2013.01); *H01R 13/622* (2013.01); *H01R 13/6581* (2013.01)

(58) Field of Classification Search

CPC .. H01R 13/6616; H01R 12/75; H01R 13/502; H01R 13/65912; H01R 4/029; H01R 4/183; H01R 13/5202; H01R 13/5205; H01R 13/622; H01R 13/6581; H01R 13/5216; H01R 13/405; H01R 4/021; H01R 31/06; H01R 2107/00; H01R 24/86; H01R 13/6592

See application file for complete search history.

(56) References Cited

U.S. PATENT DOCUMENTS

| | | | | |
|---|---|---|---|---|
| 5,736,910 A * | 4/1998 | Townsend ............ | H01R 13/719 333/185 |
| 6,302,741 B1 * | 10/2001 | Fasold ................. | H01R 13/719 439/541.5 |
| 6,616,483 B2 * | 9/2003 | Matsumoto ........ | H01R 13/6616 439/620.21 |

* cited by examiner

*Primary Examiner* — Briggitte R. Hammond
(74) *Attorney, Agent, or Firm* — Barley Snyder

(57) ABSTRACT

A connector includes an insulator, a plurality of pairs of terminals provided on the insulator, and a resistance element. The plurality of pairs of terminals include at least one pair of cable terminals electrically connected with a cable and at least one pair of vacant terminals that are unused. The resistance element is electrically connected between each pair of vacant terminals.

20 Claims, 6 Drawing Sheets

CONNECTOR, CABLE CONNECTION ASSEMBLY AND CONNECTOR ASSEMBLY

CROSS-REFERENCE TO RELATED APPLICATION

This application claims the benefit of the filing date under 35 U.S.C. § 119(a)-(d) of Chinese Patent Application No. 202110913098.X, filed on Aug. 10, 2021.

FIELD OF THE INVENTION

The present invention relates to a connector, a cable connection assembly including the connector, and a connector assembly including the connector or the cable connection assembly.

BACKGROUND

In the prior art, it is sometimes necessary to use a cable to connect a first connector with four pairs of terminals to a second connector with two pairs of terminals. There are then two pairs of unused terminals in the first connector. In the prior art, the two pairs of vacant terminals are suspended in the first connector, like two antennas, which will generate electromagnetic radiation, interfere with the surrounding signal terminals, and affect the signal transmission.

SUMMARY

A connector includes an insulator, a plurality of pairs of terminals provided on the insulator, and a resistance element. The plurality of pairs of terminals include at least one pair of cable terminals electrically connected with a cable and at least one pair of vacant terminals that are unused. The resistance element is electrically connected between each pair of vacant terminals.

BRIEF DESCRIPTION OF THE DRAWINGS

The invention will now be described by way of example with reference to the accompanying Figures, of which.

DETAILED DESCRIPTION OF THE EMBODIMENTS

Figure 1:
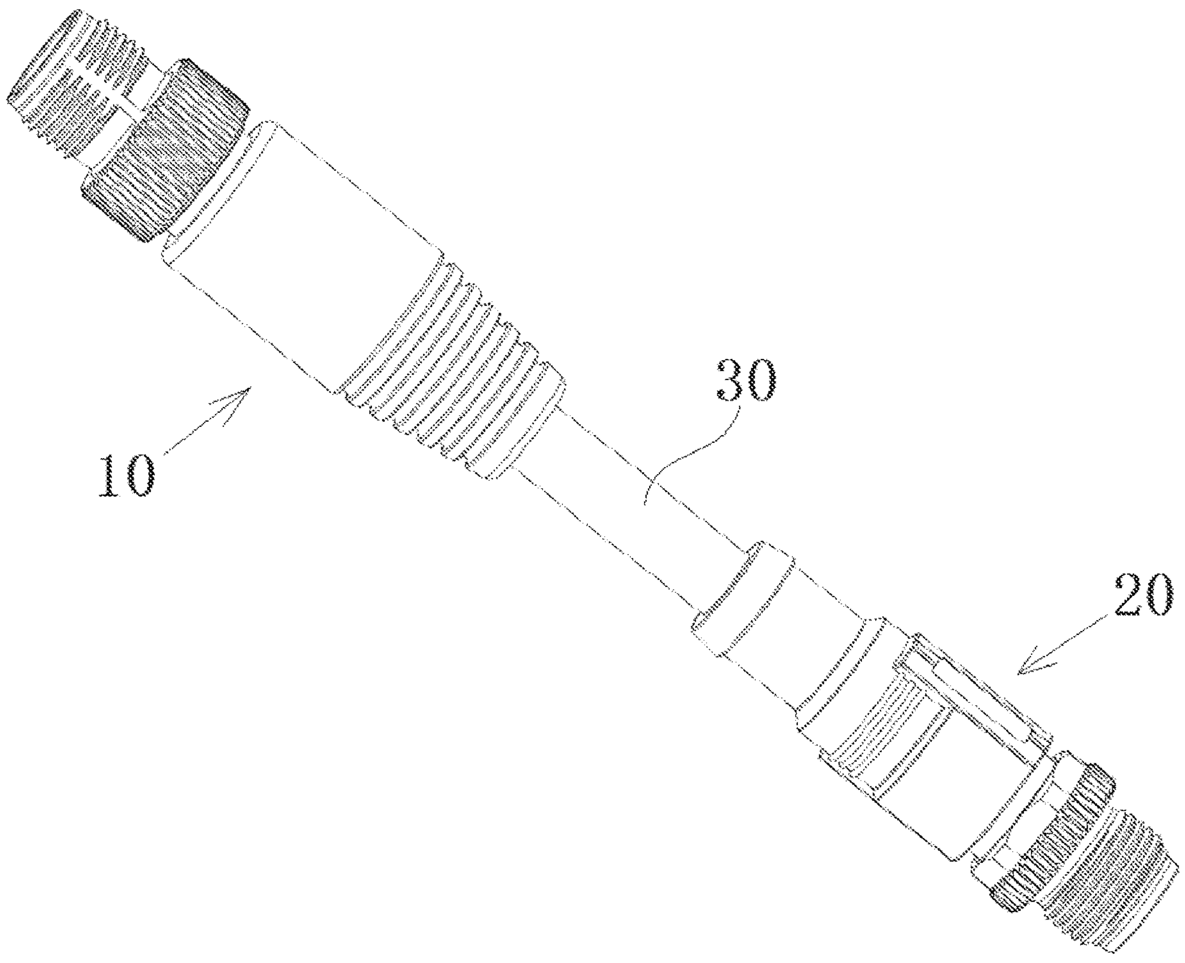
FIG. 1 shows an illustrative perspective view of a cable connection assembly according to an exemplary embodiment of the present invention.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
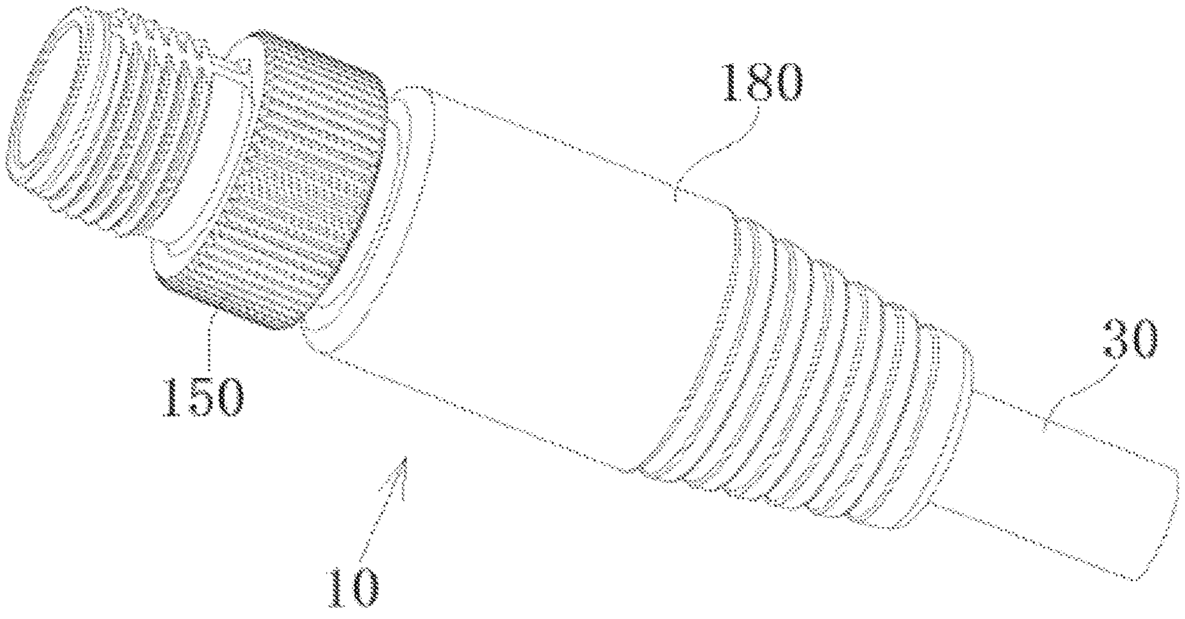
FIG. 2 shows an illustrative perspective view of a first connector in the cable connection assembly shown in FIG. 1.
Figure 3:
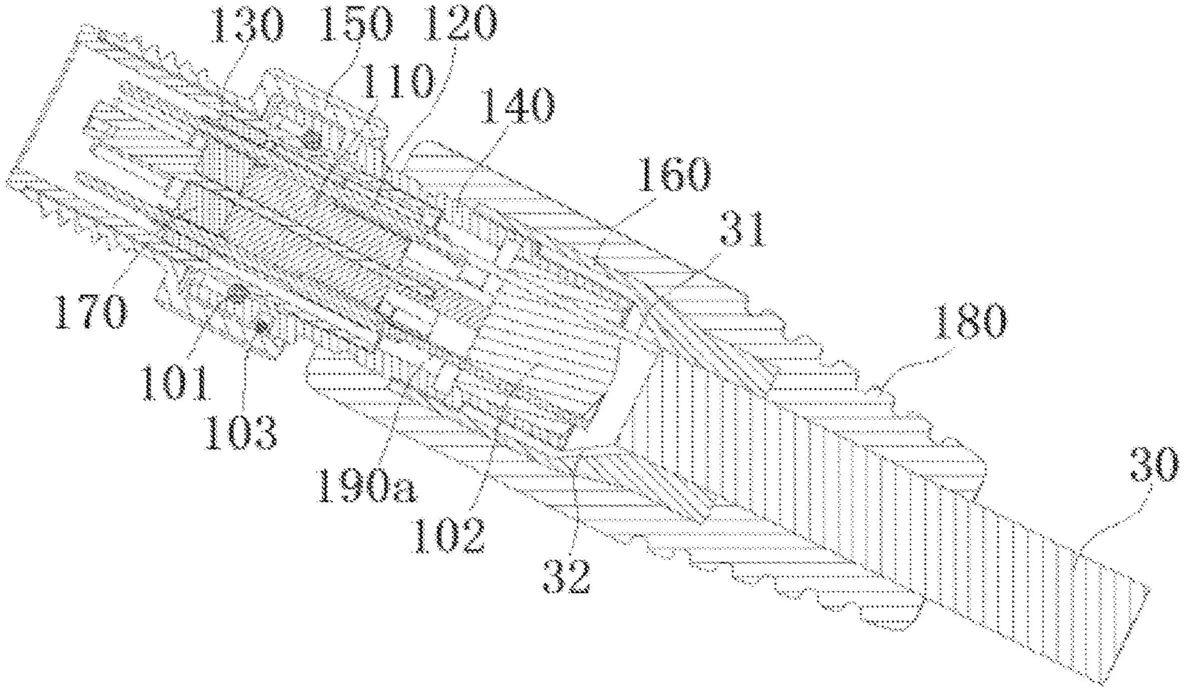
FIG. 3 shows a longitudinal sectional view of the first connector shown in FIG. 2.

As shown in FIGS. 1 to 3, in the illustrated embodiment, the cable connection assembly mainly includes a first connector 10, a second connector 20, and a cable 30 connected between the first connector 10 and the second connector 20.

As shown in FIGS. 1 to 5, in the illustrated embodiment, the first connector 10 includes an insulator 110 and a plurality of pairs of terminals 120. The plurality of pairs of terminals 120 are respectively installed in the terminal slots formed on the insulator 110. The plurality of pairs of terminals 120, 120' of the first connector 10 include at least one pair of cable terminals 120 for electrical connection with the cable 30 and at least one pair of unused vacant terminals 120'. A resistance element 190 is electrically connected between each pair of vacant terminals 120'. In the embodiment shown in this figure, each pair of vacant terminals 120' forms an electrical circuit through the resistance element 190, thereby avoiding the antenna effect caused by the vacant terminals 120' and improving the reliability of signal transmission of the connector.

As shown in FIGS. 1 to 5, in the illustrated embodiment, the connector 10 includes two pairs of vacant terminals 120' and two resistance elements 190. The resistance element 190 is connected in series between the rear ends of each pair of vacant terminals 120'. The connector 10 includes two pairs of cable terminals 120 for electrically connecting to two pairs of core wires 31 of the cable 30.

Figure 5:
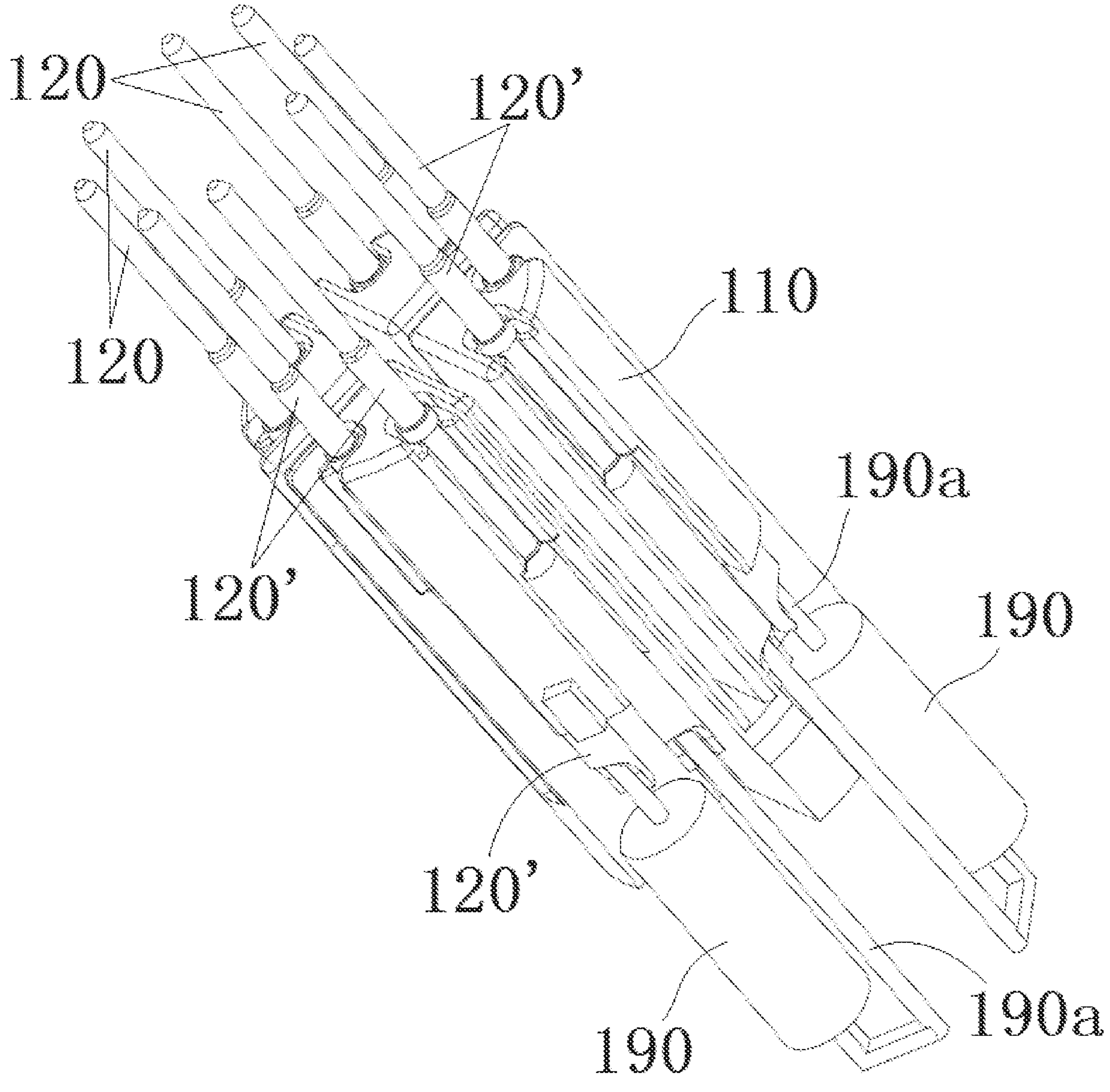
FIG. 5 shows a schematic diagram of the insulator, terminal and resistance element of the first connector shown in FIG. 3.

In the embodiment shown in FIG. 5, each resistance element 190 includes two pins **190*a*. The rear end of the vacant terminal 120' is crimped or welded to the pin 190*a* of the resistance element 190. The front end of the vacant terminal 120' is suitable for mating with a mating terminal 52 of the mating connector 50**.

As shown in FIG. 3, in the illustrated embodiment, the rear end of the cable terminal 120 is adapted to be crimped to the core wire 31 of the cable 30 to electrically connect with the core wire 31 of the cable 30. The front end of the cable terminal 120 is suitable for mating with the mating terminal 52 of the mating connector 50.

In the embodiment shown in FIG. 3, the first connector 10 also includes a housing 130, a shield shell 140, and a sealing ring 101. The housing 130 is sleeved on the insulator 110. The shield shell 140 is sleeved on the housing 130. The seal ring 101 is compressed between the housing 130 and the shield shell 140 to seal the gap between the housing 130 and the shield shell 140.

The first connector 10 further includes a conductive screw sleeve 150 and a conductive spring 103, as shown in FIG. 3. The conductive screw sleeve 150 is sleeved on the housing 130 and the shield shell 140 and is suitable for threaded connection with a mating shield shell 51 of the mating connector 50. The conductive spring 103 is compressed between the shield shell 140 and the conductive screw sleeve 150 to electrically connect the shield shell 140 and the conductive screw sleeve 150.

As shown in FIG. 3, in the illustrated embodiment, the first connector 10 also includes a heat shrinkable tube 160. One end of the heat shrinkable tube 160 is heat shrunk onto the shield shell 140, and the other end is heat shrunk onto the cable 30. The shielding layer 32 of the cable 30 is clamped between the heat shrinkable tube 160 and the shield shell 140 and welded to the shield shell 140 via a copper foil.

As shown in FIG. 3, in the illustrated embodiment, the first connector 10 also includes a sealant 102, which is filled in the rear port of the shield shell 140 to seal the rear port of the shield shell 140.

In the embodiment shown in FIG. 3, the core wire 31 of the cable 30 extends into the shield shell 140 from the rear port of the shield shell 140, and the resistance element 190 is provided in the rear port of the shield shell 140.

Figure 4:
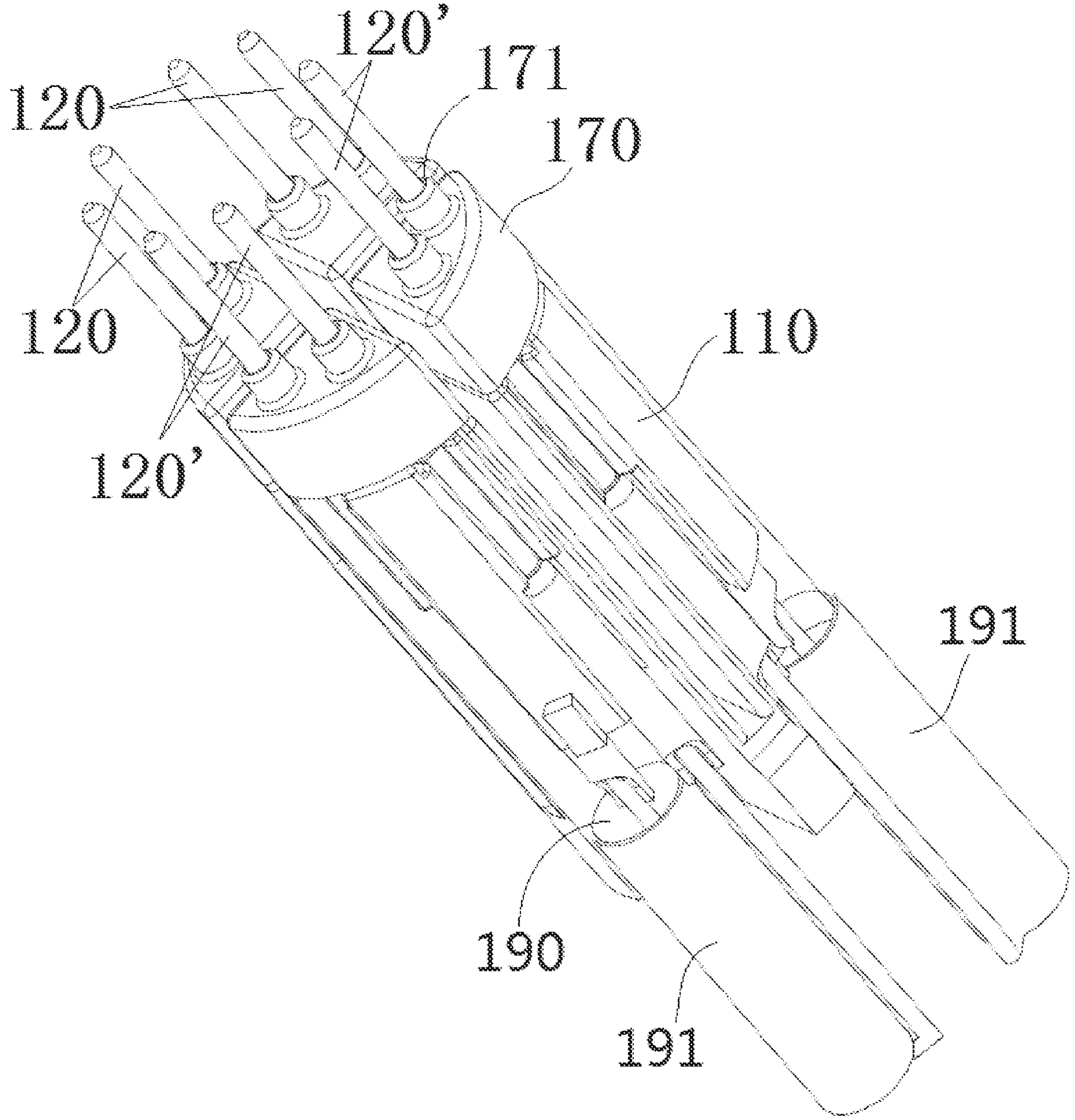
FIG. 4 shows a schematic diagram of the insulator, terminal, and positioning end cap of the first connector shown in FIG. 3.

As shown in FIG. 4, in the illustrated embodiment, the first connector 10 also includes an isolation sleeve 191, which is sleeved on the resistance element 190 to separate the resistance element 190 from the sealant 102.

In the embodiment shown in FIGS. 3 and 4, the first connector 10 also includes a plurality of positioning end caps 170. The plurality of positioning end caps 170 are assembled on the front end of the insulator 110 for positioning the front ends of the plurality of pairs of terminals 120 and 120', respectively. A pair of positioning holes 171 is formed in each positioning end cap 170. The front ends of each pair of terminals 120 and 120' pass through the pair of positioning holes 171 of the corresponding positioning end cap 170.

As shown in FIG. 2, the cable connection assembly also includes a tail sleeve 180, which is molded on the heat shrinkable tube 160 and the cable 30 of the first connector 10 by an insert injection molding manner. That is, the tail sleeve 180 is an insert injection molded piece.

As shown in FIG. 3, the cable 30 has a core wire 31 and a shielding layer 32. The core wire 31 of the cable 30 is electrically connected to the cable terminal 120 of the first connector 10, and the shielding layer 32 of the cable 30 is electrically connected to the shield shell 140 of the first connector 10. The second connector 20 shown in FIG. 1 includes a cable terminal. The cable terminal of the second connector 20 is electrically connected to the core wire 31 of the cable 30, so that the cable terminal 120 of the first connector 10 is electrically connected to the cable terminal of the second connector 20 through the core wire 31 of the cable 30. In the illustrated embodiment, the second connector 20 includes two pairs of cable terminals, and the cable 30 has two pairs of core wires 31. The two pairs of cable terminals 120 of the first connector 10 are electrically connected to the two pairs of cable terminals of the second connector 20 through the two pairs of core wires 31 of the cable 30.

As shown in FIGS. 1 to 6, in an exemplary embodiment of the present invention, a connector assembly is also disclosed. The connector assembly includes: the first connector 10 or the cable connection assembly; and a mating connector 50 adapted to mate with the first connector 10.

Figure 6:
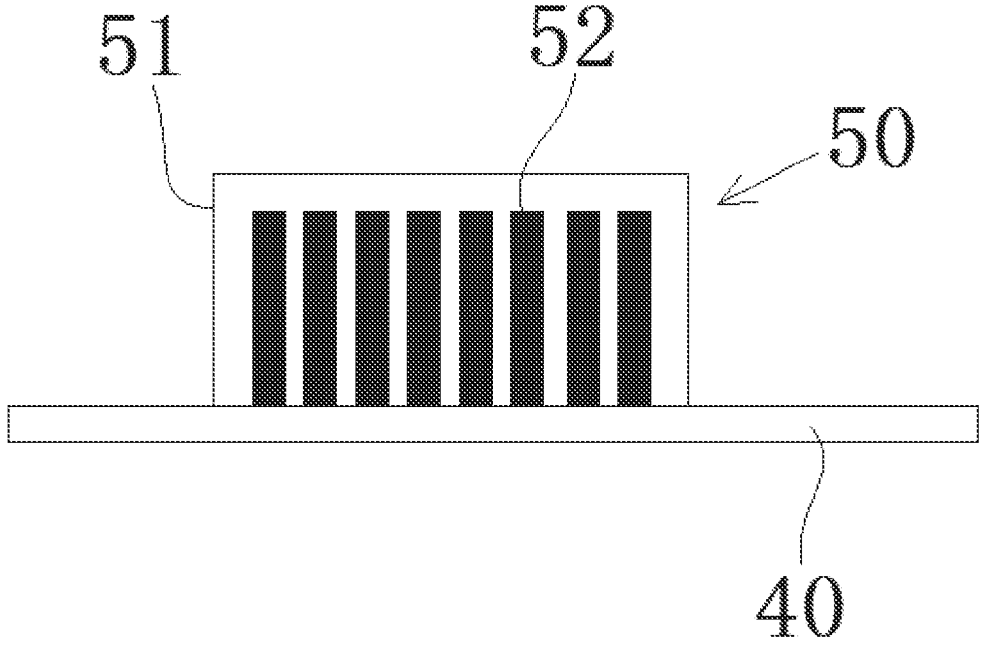
FIG. 6 shows a schematic diagram of a mating connector and a circuit board according to an exemplary embodiment of the present invention.

As shown in FIG. 6, the mating connector 50 includes a mating shield shell 51, a plurality of pairs of mating terminals 52 provided in the mating shield shell 51, and an insulation holder for holding the mating terminals 52. When the first connector 10 and the mating connector 50 are mated together, the shield shell 140 of the first connector 10 is electrically connected to the mating shield shell 51 of the mating connector 50 through the conductive screw sleeve 150, and the plurality of pairs of terminals 120 and 120' of the first connector 10 are mated with the plurality of pairs of mating terminals 52 of the mating connector 50 respectively.

As shown in FIG. 6, in the illustrated embodiment, the connector assembly also includes a circuit board 40. The mating connector 50 is mounted on the circuit board 40. In an exemplary embodiment of the present invention, the resistance value of the resistance element 190 on the first connector 10 is set to match the impedance of the circuit board 40, so that the overall circuit balance can be achieved. For example, when the impedance of the circuit board 40 is 100 Ohms, the resistance value of each resistance element 190 of the first connector 10 is set equal to 100 Ohms. In the illustrated embodiment, when the first connector 10 is mated with the mating connector 50, each pair of vacant terminals 120' forms an electrical circuit with the circuit board 40 through the resistance element 190, which can avoid the antenna effect of the vacant terminals 120' and improve the reliability of signal transmission of the connector.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

an insulator;

a plurality of pairs of terminals provided on the insulator, the plurality of pairs of terminals include at least one pair of cable terminals electrically connected with a cable and at least one pair of vacant terminals that are unused; and a resistance element electrically connected between each pair of vacant terminals.

2. The connector of claim 1, wherein the at least one pair of vacant terminals is two pairs of vacant terminals and the resistance element is one of a pair of resistance elements, each resistance element is connected in series between a pair of rear ends of each pair of vacant terminals.

3. The connector of claim 1, wherein the resistance element has a pair of pins, a rear end of each vacant terminal of the pair of vacant terminals is crimped or welded to one of the pins, a front end of each vacant terminal of the pair of vacant terminals is adapted to mate with a mating terminal of a mating connector.

4. The connector of claim 1, wherein the at least one pair of cable terminals is two pairs of cable terminals electrically connected to two pairs of core wires of the cable.

5. The connector of claim 1, wherein a rear end of each of the cable terminals is crimped onto and electrically connected with a core wire of the cable, a front end of each cable terminal of the pair of cable terminals is adapted to mate with a mating terminal of a mating connector.

6. The connector of claim 1, further comprising a housing sheathed on the insulator, a shield shell sheathed on the housing, and a sealing ring compressed between the housing and the shield shell to seal a gap between the housing and the shield shell.

7. The connector of claim 6, further comprising a conductive screw sleeve sleeved on the housing and the shield shell and capable of threadably connecting with a mating shield shell of a mating connector.

8. The connector of claim 7, further comprising a conductive spring compressed between the shield shell and the conductive screw sleeve, the conductive spring electrically connecting the shield shell and the conductive screw sleeve.

9. The connector of claim 6, further comprising a heat shrinkable tube having a first end heat shrunk onto the shield shell and a second end heat shrunk onto the cable, a shielding layer of the cable is clamped between the heat shrinkable tube and the shield shell and welded to the shield shell via a copper foil.

10. The connector of claim 6, further comprising a sealant filled in a rear port of the shield shell and sealing the rear port.

11. The connector of claim 10, wherein a core wire of the cable extends into the shield shell from the rear port, the resistance element is arranged in the rear port.

12. The connector of claim 11, further comprising an isolation sleeve sleeved on the resistance element and separating the resistance element from the sealant.

13. The connector of claim 6, further comprising a plurality of positioning end caps assembled on a front end of the insulator and positioning a front end of each of the plurality of pairs of terminals, a pair of positioning holes are formed in each positioning end cap, the front ends of each of the plurality of pairs of terminals pass through the pair of positioning holes of the corresponding positioning end cap.

14. A cable connection assembly, comprising:
- a cable having a core wire and a shielding layer; and
- a first connector including an insulator, a plurality of pairs of terminals provided on the insulator, the plurality of pairs of terminals include at least one pair of cable terminals and at least one pair of vacant terminals that are unused, and a resistance element electrically connected between each pair of vacant terminals, the first connector is connected to a first end of the cable, the core wire of the cable is electrically connected to one of the cable terminals of the first connector, and the shielding layer of the cable is electrically connected to a shield shell of the first connector.

15. The cable connection assembly of claim 14, further comprising a tail sleeve that is an insert injection molded piece formed on a heat shrinkable tube of the first connector and the cable.

16. The cable connection assembly of claim 14, further comprising a second connector connected to a second end of the cable, the second connector includes a cable terminal electrically connected to the core wire of the cable, the cable terminal of the first connector is electrically connected to the cable terminal of the second connector via the cable.

17. A connector assembly, comprising:
- a cable connecting assembly including a cable and a connector connected to an end of the cable, the cable has a core wire and a shielding layer, the connector has an insulator, a plurality of pairs of terminals provided on the insulator, the plurality of pairs of terminals include at least one pair of cable terminals and at least one pair of vacant terminals that are unused, and a resistance element electrically connected between each pair of vacant terminals, the core wire of the cable is electrically connected to one of the cable terminals, and the shielding layer of the cable is electrically connected to a shield shell of the connector; and
- a mating connector matable with the connector.

18. The connector assembly of claim 17, wherein the mating connector includes a mating shield shell and a plurality of pairs of mating terminals arranged in the mating shield shell, when the connector and the mating connector are mated together, the shield shell of the connector is electrically connected to the mating shield shell, and the plurality of pairs of terminals of the connector are mated with the plurality of pairs of mating terminals.

19. The connector assembly of claim 17, further comprising a circuit board, on which the mating connector is installed, when the connector is mated with the mating connector, each pair of vacant terminals forms an electrical circuit with the circuit board through the resistance element, a resistance value of the resistance element is set to match an impedance of the circuit board.

20. The connector assembly of claim 19, wherein the impedance of the circuit board and the resistance value of the resistance element is equal to 100 Ohms.

* * * * *